US008393348B2

(12) United States Patent
Tougasaki et al.

(10) Patent No.: US 8,393,348 B2
(45) Date of Patent: Mar. 12, 2013

(54) DIRECTIONAL CONTROL VALVE DEVICE AND DIRECTIONAL CONTROL VALVE DEVICE BLOCK HAVING DIRECTIONAL CONTROL VALVE DEVICES

(75) Inventors: Mitsuhisa Tougasaki, Tsuchiura (JP); Katsumi Ueno, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 832 days.

(21) Appl. No.: 12/527,956

(22) PCT Filed: Feb. 18, 2008

(86) PCT No.: PCT/JP2008/052669
§ 371 (c)(1), (2), (4) Date: Aug. 20, 2009

(87) PCT Pub. No.: WO2008/102734
PCT Pub. Date: Aug. 28, 2008

(65) Prior Publication Data

US 2010/0059130 A1 Mar. 11, 2010

(30) Foreign Application Priority Data

Feb. 21, 2007 (JP) ................................ 2007-041023

(51) Int. Cl.
*G05D 11/00* (2006.01)

(52) U.S. Cl. .............................. 137/115.19; 137/596.13

(58) Field of Classification Search ............. 137/115.07, 137/115.18, 115, 19, 596, 596.13, 115.23, 137/599.08, 599.09, 625.66; 251/28, 29; 91/444, 445, 446, 448, 461
See application file for complete search history.

(56) References Cited

U.S. PATENT DOCUMENTS

| | | | | | |
|---|---|---|---|---|---|
| 2,664,908 | A | * | 1/1954 | Strnad | 137/115.19 |
| 3,416,561 | A | * | 12/1968 | Kokaly | 137/596.13 |
| 3,779,133 | A | * | 12/1973 | Dezelan | 91/446 |

(Continued)

FOREIGN PATENT DOCUMENTS

| | | | |
|---|---|---|---|
| JP | 7-279906 | A | 10/1995 |
| JP | 7-293510 | A | 11/1995 |

(Continued)

OTHER PUBLICATIONS

International Search Report dated Mar. 25, 2008 with English translation (four (4) pages).

*Primary Examiner* — Craig Schneider
*Assistant Examiner* — Craig J Price
(74) *Attorney, Agent, or Firm* — Crowell & Moring LLP

(57) ABSTRACT

A control valve has a pressure chamber 24 causing a pressure to act on a valve element 21 of a check valve 20, an oil chamber 39 around the valve 21, a slot 40 formed in the valve element 21 and interconnecting the oil chamber 39 and the pressure chamber 24with each other and, a control valve 25 connected directly to a divergence portion 17 and the oil chamber 39 and capable of permitting or cutting off communication between the divergence portion 17 and the oil chamber 39 and changing an opening degree of the communication, an intra-valve-element passage 42, a slot 41 formed in an outer peripheral wall of the valve element 21 and communicating the passage 42 and the chamber 39 with each other, and a spring-return auxiliary check valve 43 for allowing pressure oil to flow from a supply passage 15 into the intra-valve-element passage 42.

3 Claims, 7 Drawing Sheets

U.S. PATENT DOCUMENTS

| | | | | | |
|---|---|---|---|---|---|
| 3,964,505 | A * | 6/1976 | McAvoy | 137/596.13 |
| 3,977,301 | A * | 8/1976 | Kroth et al. | 137/596.13 |
| 3,995,532 | A * | 12/1976 | Junck et al. | 137/596.13 |
| 4,154,262 | A * | 5/1979 | Blume et al. | 91/446 |
| 5,433,076 | A | 7/1995 | Sugiyama et al. | |
| 6,745,564 | B2 * | 6/2004 | Koo | 91/444 |
| 6,915,729 | B2 * | 7/2005 | Kim | 137/596.13 |
| 7,380,489 | B2 * | 6/2008 | Jeon | 91/446 |
| 2004/0237772 | A1 | 12/2004 | Kim | |

FOREIGN PATENT DOCUMENTS

| | | | |
|---|---|---|---|
| JP | 2004-353859 | A | 12/2004 |
| JP | 2006-17273 | A | 1/2006 |
| WO | WO 94/10456 | A1 | 5/1994 |

* cited by examiner

DIRECTIONAL CONTROL VALVE DEVICE AND DIRECTIONAL CONTROL VALVE DEVICE BLOCK HAVING DIRECTIONAL CONTROL VALVE DEVICES

TECHNICAL FIELD

This invention relates to a directional control valve assembly, in which a check valve for controlling a flow rate of pressure oil flowing into a directional control valve as a main valve and a control means for limiting an opening degree of the check valve by causing a pressure to act on a valve element of the check valve are integrated with the directional control valve.

BACKGROUND ART

With reference to FIG. 7, a description will be made about a conventional directional control valve assembly 100. FIG. 7 is a cross-sectional view of the conventional directional control valve assembly.

The conventional directional control valve assembly 60 is provided with a directional control valve 10 as a main valve, a check valve 20 for controlling a flow rate of pressure oil to be allowed to pass through the directional control valve 10, and a control means for controlling the check valve 20.

The directional control valve 10 is a spool valve, and is a spring-centered three-position valve. Formed in a valve body 61 of the directional control valve 10 are a supply port 12, first and second reservoir ports 13A, 13B, first and second I/O ports 14A,14B, a supply passage 15 extending from the supply port 12, and first and second branch passages 16A, 16B diverged from the supply passage 15.

The three valve positions of the directional control valve 10 include a neutral position, a first position and a second position. At the neutral position, the directional control valve 10 cuts off communication between the first branch passage 16A and the first I/O port 14A and also cuts off communication between the second I/O port 14B and the second branch passage 16B. At the first valve position, the directional control valve 10 communicates the first branch passage 16A and the first I/O port 14A but cuts off the communication between the second I/O port 14B and the second branch passage 16B to bring the second I/O port 14B into communication with the second reservoir port 13B. At the second valve position, the directional control valve 10 communicates the second branch passage and the second I/O port but cuts off the communication between the first I/O port 14A and the first branch passage 16A to bring the first I/O port 14A into communication with the first reservoir port 13A.

The check valve 20 is a spring-return valve, which is arranged to be capable of permitting or cutting off communication between a divergence portion 17, where the first and second branch passages 16A, 16B are diverged from the supply passage 15, and the supply passage 15 and to limit a flow of pressure oil between the supply passage 15 and the divergence portion 17 of the first and second branch passages 16A,16B to a direction that the flow is directed from the supply passage 15 toward the divergence portion 17.

The control means is provided with a pressure chamber 24 and a control valve 25. The pressure chamber 24 also serves as a spring chamber for a return spring 23 of the check valve 20, and can apply a pressure to a valve element 21 of the check valve 20 in a same direction as a biasing force by the return spring 23. The control valve 25 has a first port 31 interconnected with the divergence portion 17 via the second branch passage 16*b* and passages 62,63, a second port 32 interconnected with the pressure chamber 24 via a passage 64, and a spool 26 formed to be capable of permitting and cutting off communication between the first and second ports 31,32 and changing an opening degree of the communication.

The control means also has an oil chamber 39 formed in an outer peripheral wall of the valve element 21 of the check valve 20, an annular cutout 65 formed in the valve body 61 and being open to the pressure chamber 24 formed in the valve body 61, and a control slot 41 interconnecting these oil chamber 39 and annular cutout 65 with each other. Also arranged are an intra-valve-element passage 42 and au auxiliary check valve 43. The intra-valve-element passage 42 is formed inside the valve element 21 of the check valve 20, and is open at an end portion of the valve element 21, said end portion facing the supply passage 15, and also at the outer peripheral wall of the valve element 21, said outer peripheral wall facing the oil chamber 39. The auxiliary check valve 43 is arranged on the intra-valve-element passage 42, and allows pressure oil of a preset pressure or higher to flow from the supply passage 15 into the intra-valve-element passage 42.

The conventional directional control valve 60 is further provided with a protective member 66 and a rectifying member 67. The protective member 66 prevents positional displacements of the return spring 23 by flows of pressure oil that occur between the pressure chamber 24 and the second port 32. The rectifying member 67 straightens up each flow between the pressure chamber 24 and the second port 32.

Directional control valve assemblies of this kind include one disclosed in Patent Document 1.

Patent Document 1: JP-A-2006-017273

DISCLOSURE OF THE INVENTION

Problem to be Solved by the Invention

In the above-mentioned conventional directional control valve assembly 60, the second port 32 of the control valve 24 is interconnected with the oil chamber 39 via the passage 64, pressure chamber 24, annular cutout 65 and control slot 42. When the auxiliary check valve 43 opens while the control valve 25 is in an open state, pressure oil is guided from the supply port 12 by way of the intra-valve-element passage 42, oil chamber 39, control slot 41, annular cutout 65, pressure chamber 24, passage 64, control valve 25, passages 62,63 and second branch passage 16B, and flows out into the divergence portion 17, that is, the pressure chamber 24 is included in the passage that guides the pressure oil from the supply port 12 to the divergence portion 17.

Upon raising the pressure in the pressure chamber 24 with the opening degree of the control valve 25 being set at a desired opening degree smaller than the fully opened degree, a pressure loss may hence take place due to a flow of pressure oil that occurs in the pressure chamber 24, thereby possibly affecting control characteristics of the control valve 25. There is also a need for the protective member 66 for protecting the return spring 23 from the flow of pressure oil and the rectifying member 67 for straightening up the flow of pressure oil. Accordingly, the inclusion of the pressure chamber 24 in the passage that guides pressure oil from the supply port 12 to the divergence portion 17 is not preferred either from the viewpoint of reducing the number of parts or components.

With the above-mentioned circumstances in view, the present invention has as an object thereof the provision of a directional control valve assembly, in which a check valve for controlling a flow rate of pressure oil to be guided to a directional control valve as a main valve and a control means for limiting an opening degree of the check valve by a pressure are integrated with the directional control valve and therefore, a flow hardly occurs in the pressure oil that produces the pressure.

Means for Solving the Problems

To achieve the above-mentioned object, the present invention is constructed as will be described next.

[1] The present invention provides a directional control valve assembly provided with a directional control valve as a main valve, a check valve for controlling a flow rate of pressure oil flowing into the directional control valve, and control means for causing a pressure to act on a valve element, which the check valve is provided with, to limit an opening degree of the check valve.

The directional control valve is provided with a supply port, first and second I/O ports, a supply passage extending from the supply port, and first and second branch passages diverged from the supply passage, and can be switched into a neutral position where the directional control valve cuts off communication between the first branch passage and the first I/O port and also communication between the second I/O port and the second branch passage, a first valve position where the directional control valve communicates the first branch passage and the first I/O port with each other but cuts off the communication between the second I/O port and the second branch passage, or a second valve position where the directional control valve communicates the second branch passage and the second I/O port with each other but cuts off the communication between the first I/O port and the first branch passage.

The check valve is a spring-return valve that is arranged to be capable of permitting or cutting off communication between a divergence portion, where the first and second branch passages are diverged from the supply passage, and the supply passage and to limit a flow of pressure oil to a direction that the flow is directed from the supply passage toward the divergence portion.

The control means has a pressure chamber capable of causing the pressure, which is in a same direction as a biasing direction by a return spring which the check valve is provided with, to act on the valve element, an oil chamber formed around the valve element, a slot formed in at least one of the valve element and a wall of a slide hole, in which the valve element slides, to interconnect the oil chamber and the pressure chamber with each other, a control valve connected directly to the divergence portion and the oil chamber and capable of permitting or cutting off the communication between the divergence portion and the oil chamber and changing an opening degree of the communication, an intra-valve-element passage formed inside the valve element and being open in an end portion of the valve element, the end portion facing the supply passage, and also in an outer peripheral wall of the valve body, said outer peripheral wall being located between the divergence portion and the oil chamber, a control slot formed in the outer peripheral wall of the valve element to communicate the intra-valve-element passage and the oil chamber with each other, and an auxiliary check valve arranged on the intra-valve-element passage to allow pressure oil of a preset pressure or higher to flow from the supply passage into the intra-valve-element passage.

Among operations of the directional control valve assembly of the present invention constructed as described above, its operation in states in which the directional control valve has been operated to the first valve position and to the second valve position, respectively, will be described.

In the state that the control valve is fully open, the pressure chamber are in communication with the divergence portion via the slot, oil chamber and control valve and, even when pressure oil flows between the oil chamber and the divergence portion in the control valve, no resistance is produced to the flow of the pressure oil. Therefore, even when the auxiliary check valve is opened by a pressure guided from the supply port via the supply passage and the pressure oil flows from the supply port into the intra-valve-element passage, the pressure oil is not guided into the pressure chamber, but passes through the intra-valve-element passage, control slot, oil chamber and control valve in this order and is then allowed to flow out into the divergence portion.

Even when the control valve is in an open state, resistance is still produced to a flow of pressure oil when the pressure oil flows between the oil chamber and the divergence portion in the control valve if the opening degree of the control valve at that time is smaller than that at the time of full opening. When the auxiliary check valve is opened by a pressure from the supply port and the pressure oil flows from the supply port into the intra-valve-element passage, the pressure oil is divided under the action of the above-described resistance into two portions, one being guided from the intra-valve-element passage to the pressure chamber via the oil chamber and slot and residing there, and the other passing through the intra-valve-element passage, control slot, oil chamber and control valve in this order and flowing out into the divergence portion.

In essence, the passage for guiding pressure oil from the supply port to the pressure chamber and the passage for guiding pressure oil from the supply port to the divergence portion are divided from each other after the oil chamber in the directional control valve assembly according to the present invention, so that the pressure chamber is not included in the passage that guides pressure oil from the supply port to the divergence portion. As a consequence, a flow is hardly allowed to occur in the pressure oil for producing a pressure to limit the opening degree of the check valve.

[2] The present invention may provide the directional control valve assembly as described in [1], wherein a slide hole for a spool of the directional control valve, the slide hole for the valve element of the check valve, and a slide hole for a valve element for the control valve are all arranged in a single valve body, and the check valve and the control valve are adjacent to each other such that an operating direction of the valve element of the check valve and an operating direction of the valve of the control valve become parallel to each other. This construction facilitates to provide a directional control valve assembly with reduced dimensions.

[3] The present invention also provides a directional control valve assembly block comprising a plurality of directional control valve assemblies as defined in claim 2 and a valve body composed as an integral unit of valve bodies of the respective directional control valve assemblies, wherein a plurality of passages, which extend from respective drain ports of plural control valves, and a passage, which is interconnected with all of the passages and is open to an outside of the integrated valve body, are formed in the integrated valve body.

The directional control valve assembly block of the present invention constructed as described above can facilitate the piping work for forming passages to guide drains from the respective control valves in the directional control valve assembly block to a working oil reservoir.

Advantageous Effects of the Invention

As mentioned above, the pressure chamber is not included in the passage that guides pressure oil from the supply port to the divergence portion in the present invention, because the passage for guiding pressure oil from the supply port to the pressure chamber and the passage for guiding pressure oil from the supply port to the divergence portion are divided from each other after the second oil chamber. Therefore, a flow is hardly allowed to occur in the pressure oil for producing a pressure to limit the opening degree of the check valve. As a result, it is possible to reduce a pressure loss in the pressure chamber of the directional control valve assembly. In addition, it is also possible to omit a part for protecting a spring from flows of pressure oil and also a part for straightening up the flows of pressure oil.

BEST MODES FOR CARRYING OUT THE INVENTION (Directional Control Valve Assembly)

Referring to drawings, a description will be made about the construction of one embodiment of the directional control valve assembly according to the present invention. FIG. 1 is a cross-sectional view of the one embodiment of the directional control valve assembly according to the present invention. FIG. 2 is an enlarged cross-sectional view of a control means corresponding to a view taken in the direction of arrows II-II of FIG. 1.

This embodiment is directed to a directional control valve assembly 1 shown in FIG. 1, which is provided with a directional control valve 10 as a main valve, a check valve 20 for controlling a flow rate of pressure oil to be allowed to flow into the directional control valve 10, and a control means for limiting an opening degree of the check valve 20 by causing a pressure to act on a valve element of the check valve 20.

The directional control valve 10 is a hydraulically-piloted spool valve, and is a spring-centered three-position valve. Formed in a valve body 11 of the directional control valve 10 are a supply port 12, first and second reservoir ports 13A,13B, first and second I/O ports 14A,14B, a supply passage 15 extending from the supply port 12, and first and second branch passages 16A,16B diverged from the supply passage 15.

The three valve positions of the directional control valve 10 include a neutral position, a first position and a second position. At the neutral position, the directional control valve 10 cuts off communication between the first branch passage 16A and the first I/O port 14A and also cuts off communication between the second I/O port 14B and the second branch passage 16B. At the first valve position, the directional control valve 10 communicates the first branch passage 16A and the first I/O port 14A but cuts off the communication between the second I/O port 14B and the second branch passage 16B to bring the second I/O port 14B into communication with the second reservoir port 13B. At the second valve position, the directional control valve 10 communicates the second branch passage and the second I/O port but cuts off the communication between the first I/O port 14A and the first branch passage 16A to bring the first I/O port 14A into communication with the first reservoir port 13A.

As depicted in FIG. 2, the check valve 20 is a spring-return valve, which is arranged to be capable of permitting or cutting off communication between a divergence portion 17, where the first and second branch passages 16A, 16B are diverged from the supply passage 15, and the supply passage and to limit a flow of pressure oil to a direction that the flow is directed from the supply passage 15 toward the divergence portion 17.

The control means has a pressure chamber capable of applying a pressure to a valve element 21 of the check valve in a same direction as a biasing force by the return spring 23, for example, a pressure chamber 24 arranged on a rear side of the valve element 21 (on an upper side of FIG. 2) such that the pressure chamber also serves as a spring chamber for the return spring 23, an annular chamber 39 formed around the valve element 21, a slot 40 interconnecting the oil chamber 39 formed in at least one of the valve element 21 and a wall of a slide hole 22 in which the valve element 21 slides, for example, in only the valve element 21 and the pressure chamber 24 with each other, and a control valve 25 connected directly to the divergence portion 17 and oil chamber 39 and capable of permitting or cutting off communication between the divergence portion 17 and the oil chamber 39 and controlling the opening degree of the communication. In the valve element 21 of the check valve 20, a magnitude correlation between a pressure-receiving area A1 that receives a pressure from the pressure chamber 24 and a pressure-receiving area A2 that receives a pressure from the supply passage 15 is set such that the valve element 21 is displaced in a closing direction when the interior of the supply passage 15 and that of the pressure chamber 24 are the same.

The control valve 25 is a spring-return spool valve. From the side of an outer periphery of the spool 26 of the control valve 25, first and second ports 31,32 extend such that they are aligned in the direction of an axis of the spool 26. The first port 31 is open to the divergence portion 17.

Arranged on the side of one end of a slide hole 30 in the control valve 25 are a pilot pressure chamber 33 interconnected with the slide hole 30 and a pilot port 34 for guiding a pilot pressure to the pilot pressure chamber 33. At an opposite end of the slide hole 30, a drain port 35 is formed.

One end portion of the spool 26 is composed of a large-diameter portion 27 facing the pilot pressure chamber 33. An opposite end portion of the spool 26 is composed of a large-diameter portion 28 having the same diametrical dimension as the large-diameter portion 27. Formed between the large-diameter portions 27 and 28 is a small-diameter portion 29 having a diametrical dimension smaller than the large-diameter portions 27,28. The length dimension of the small-diameter portion 29 in the direction of the axis of the spool 26 is set longer than the interval dimension between the first and second ports 31 and 32. In the large-diameter portion 27, a control slot 27*a* is formed extending from an end face on the side of the small-diameter portion 29 toward the side of the pilot pressure chamber 33. The lengthwise direction of the control slot 27*a* in the direction of the axis of the spool 26 is set shorter than a maximum displacement of the spool 26.

Within the pilot pressure chamber 33, a return spring 38 of the control valve 25 is accommodated. A rod-shaped portion 36 extends from the large-diameter portion 27 into the pressure chamber 24. On an end of the rod-shaped portion 36, a spring seat 37 is formed for one end of the return spring 38. A spring seat for the opposite end of the return spring 38 is composed of an end face 11*a* of the valve body 11, said end face 11*a* being located on a side of an outer periphery of the slide hole 30.

As depicted in FIG. 2, the neutral position of the control valve 25A is a valve position where a passage through which the first and second ports 31,32 are communicated with each other is formed by a gap 25*a*, a cylindrical space 25*b* and a gap 25*c*. The gap 25*a* is formed between a wall 30*a* of the slide hole 30, said wall 30*a* surrounding the small-diameter portion 29, and an end face of the large-diameter portion 27, said end face being located on the side of the small-diameter portion 29. The cylindrical space 25*b* is formed between the small-diameter portion 29 and the wall 30*a* of the slide hole 30. The gap 25*c* is formed between an end face of the large-diameter portion 27, said end face being located on the side of the small-diameter portion 29, and the wall 30*a* of the slide hole 30.

The control means also has an intra-valve-element passage 42, a control slot 41 and a spring-return auxiliary check valve 43. The intra-valve-element passage 42 is formed inside the valve element 21 of the check valve 20, and is open at an end portion of the valve element 21, said end portion facing the supply passage 15, and also at the outer peripheral wall of the valve element 21, said outer peripheral wall being located between the divergence portion 27 and the oil chamber 39. The control slot 41 is formed in the outer peripheral wall of the valve element 21 and communicates the intra-valve-element passage 42 and the oil chamber 39 with each other. The auxiliary check valve 43 is arranged on the intra-valve-element passage 42, and allows pressure oil of a preset pressure or higher to flow from the supply passage 15 into the intra-valve-element passage 42.

It is to be noted that a slide hole 19 for a spool 38 of the directional control valve 10, the slide hole 22 for the valve element 21 of the check valve 20 and the slide hole 30 for the spool 26 of the control valve 25 are all arranged in the single valve body 11. In other words, valve bodies for the directional control valve 10, check valve 20 and control valve 25 are formed as an integral unit. Further, the check valve 20 and the control valve 25 are adjacent to each other such that the operating direction of the valve element 21 of the check valve 20 and the operating direction of the spool 26 of the control valve 25 become parallel to each other. The slide hole 22 of the check valve 20 and the slide hole 30 of the control valve 25 are provided with openings 22*a*,30*b*, which are open at the end face 11*a* of the valve body 11, respectively. These openings 22*a* and 30*b* is covered by a cap 44. In the cap 44, the pressure chamber 24, pilot pressure chamber 33 and pilot port 34 are formed.

Among operations of the directional control valve assembly 1 constructed as described above, its operations in states that the directional control valve 10 has been operated to the first valve position and to the second valve position, respectively, will be described.

(Operation Upon Full Opening of the Check Valve 20)

FIG. 3 is a cross-sectional view illustrating a fully open state of the check valve depicted in FIG. 2. As illustrated in FIG. 3, the control valve 25 is maintained at the neutral position by the return spring 38 in the state that no pilot pressure is supplied from the pilot port 34 to the pilot pressure chamber 33. Namely, the control valve 25 is fully open.

In the state that the control valve 25 is fully open as described above, the pressure chamber 24 is in communication with the divergence portion 17 via the slot 40, oil chamber 39 and control valve 25. Even when pressure oil flows between the oil chamber 39 and the divergence portion 17, no resistance is produced to the flow of the pressure oil in this state. Accordingly, when the auxiliary check valve 43 opens by a pressure guided from the supply port 12 via the supply passage 15 and the pressure oil flows from the supply port 12 into the intra-valve-element passage 42, the pressure oil is not guided into the pressure chamber 24, but passes through the intra-valve-element passage 42, control slot 41, oil chamber 39 and control valve 25 in this order and flows out into the divergence portion 17.

When the pressing force applied to the valve element 21 by the pressure from the supply passage 15 becomes greater than the pressing force applied to the valve element 21 by the return spring 23 of the check valve 20 at this time, the check valve 20 moves against the return spring 23 to communicate the supply port 12 and the divergence portion 17 with each other. As a result, the pressure oil in the pressure chamber 24 is pressed out and is caused to flow out into the divergence portion 17 via the slot 40, oil chamber 39 and control valve 25. As mentioned above, the control valve 25 is fully open, and no resistance is produced to the flow of pressure oil between the oil chamber 39 and the divergence portion 17. As a consequence, when the pressure in the supply port 12 is sufficiently high compared with the restoring force of return spring 23, the valve 21 moves until it comes into contact with a limiting portion 45 formed on the cap 44, in other words, the check valve 20 fully opens. Therefore, no limitation is imposed on the flow rate of pressure oil that flows into the directional control valve 10 from the supply port 12.

(Operation Upon Half Opening of the Check Valve 20)

FIG. 4 is a cross-sectional view illustrating a half open state of the check valve depicted in FIG. 2. When a pilot pressure of low pressure, for example, 1 MPa is supplied to the pilot pressure chamber 33 from the pilot port 34 as illustrated in FIG. 4, the spool 26 of the control valve 25 is displaced to a position where pressing force applied from the pilot pressure and the pressing force applied by the return spring 38 balance each other. As a result, the outer peripheral wall of the large-diameter portion 27 overlaps with the wall 30*a* of the slide hole 30, so that the passage that communicates the first and second ports 31,32 with each other is formed by the control slot 27*a* formed in the large-diameter portion 27, the cylindrical space 25*b* formed between the small-diameter portion 29 and the wall 30*a* of the slide hole 30, and the gap 25*c* formed between the end face of the large-diameter portion 28, said end face being on the side of the small-diameter portion 29, and the wall 30*a* of the slide hole 30. The flow passage area between the control groove 27*a* and the wall 30*a* of the slide hole 30 is smaller than the flow passage area of the gap 25*a* at the time of full opening of the control valve 25 so that the opening degree of the control valve 25 becomes smaller than the opening degree at the time of full opening.

In the state that the opening degree of the control valve 25 has become smaller than the opening degree at the time of full opening as described above, resistance is produced to a flow of pressure oil when the flow of pressure oil occurs between the oil chamber 39 and the divergence portion 17 in the control valve 25. This resistance increases as the opening degree of the control valve 25, in other words, the displacement of the spool 26 from its neutral position become greater.

When the auxiliary check valve 43 opens by a pressure from the supply passage 15 and pressure oil flows from the supply pressure 15 into the intra-valve-element passage 42, the pressure oil is divided under the action of the above-described resistance into two portions, one being guided from the intra-valve-element passage 42 to the pressure chamber 24 via the oil chamber 39 and slot 40 and residing there, and the other passing through the intra-valve-element passage 42, control slot 41, oil chamber 39 and control valve 25 in this order and flowing out into the divergence portion 17. The pressure oil which resides in the pressure chamber 24 raises the pressure inside the pressure chamber 24, and hence, the pressure inside the pressure chamber 24 becomes closer the pressure in the supply port 12. As a result, the force required to displace the valve element 21 of the check valve 20 in the opening direction becomes greater so that the opening degree of the check valve 20 is limited. As a consequence, a limitation is imposed on the flow rate of the pressure oil that flows into the directional control valve 10 from the supply port 12.

(Operation Upon Closing of the Check Valve 20)

FIG. 5 is a cross-sectional view illustrating a state that the check valve has been closed by an operation of the auxiliary check valve depicted in FIG. 2. When a pilot pressure of high pressure, for example, 4 MPa is supplied to the pilot pressure chamber 33 from the pilot port 34 as illustrated in FIG. 5, the spool 26 of the control valve 25 is caused to shift full stroke. As a result, the outer peripheral wall of the large-diameter portion 27 overlaps with the wall 30*a* of the slide hole 30 to a part on the side of the pilot pressure chamber 33 beyond the control slot 27*a*, so that the communication between the first and second ports 31,32 is cut off. In other words, the control valve 25 is closed.

In the state that the control valve 25 is closed as described above, when the auxiliary check valve 43 opens by a pressure from the supply passage 15 and pressure oil flows into the intra-valve-element passage 42 from the supply passage 42, the pressure oil is guided in its entirety from the intra-valve-element passage 42 to the pressure chamber 24 via the oil chamber 39 and slot 40 and then resides there. Therefore, the pressure inside the pressure chamber 25 rises until it becomes equal to that in the supply passage 15. As a result, the valve element 21 is pushed back by the pressure in the pressure chamber 24 and the return spring 23 so that the check valve 20 is closed. As a consequence, the supply passage 15 and the divergence portion 15 are cut off from each other, and pressure oil is no longer allowed to flow into the directional control valve 10 from the supply port 12.

According to the directional control valve assembly 1, the following advantageous effects can be brought about.

The passage for guiding pressure oil from the supply port 12 to the pressure chamber 24 and the passage for guiding pressure oil from the supply port 12 to the divergence portion 17 are divided from each other after the oil chamber in the directional control valve assembly 1, so that the pressure chamber 24 is not included in the passage that guides pressure oil from the supply port 12 to the divergence portion 17. Therefore, a flow is hardly allowed to occur in the pressure oil for producing a pressure to limit the opening degree of the check valve 20. As a result, it is possible to reduce a pressure loss in the pressure chamber of the directional control valve assembly. In addition, it is also possible to omit a part for protecting a spring from flows of pressure oil and also a part for straightening up the flows of pressure oil.

In the directional control valve assembly 1, the slide holes 19,22,30 for the spool 18 of the directional control valve 10, the valve element 21 of the check valve 20 and the spool 26 of the control valve 25 are all arranged in the single valve body 11, and the check valve 20 and the control valve 25 are adjacent to each other so that the operating direction of the valve element 21 of the check valve 20 and the operating direction of the spoon 26 of the control valve 25 become parallel to each other. This construction facilitates to provide a directional control valve assembly with reduced dimensions.

(Directional Control Valve Assembly Block)

With reference to FIG. 6, a description will be made about one embodiment of the directional control valve assembly block according to the present invention. FIG. 6 is a cross-sectional view of the one embodiment of the directional control valve assembly block according to the present invention.

This embodiment is directed to a directional control valve assembly block 50. This directional control valve assembly block 50 is provided with a plurality, for example, three of directional control valve assemblies 1 as described above, and is provided with a valve body 51 composed as an integral unit of the valve bodies of the respective directional control valve assemblies 1.

Formed in the valve body 51 are a supply port 52 and a passage 53 for guiding oil pressure from the supply port 52 to the supply ports 12 of the respective directional control valves 10. The supply port 52 is connected to a hydraulic pump 54.

Formed within the valve body 51 are three passages 55 extending from the respective drain ports 34 of the three control valves 25 and a passage 56 interconnected with all of these passages 55 and being open to an outside of the valve body 51. The passage 56 is connected to a working oil reservoir 57.

The directional control valve assembly block 50 constructed as described above can facilitate the piping work for forming passages to guide drains from the respective control valves 25 in the directional control valve assembly block 50 to the working oil reservoir 57.

LEGEND

Figure 1:
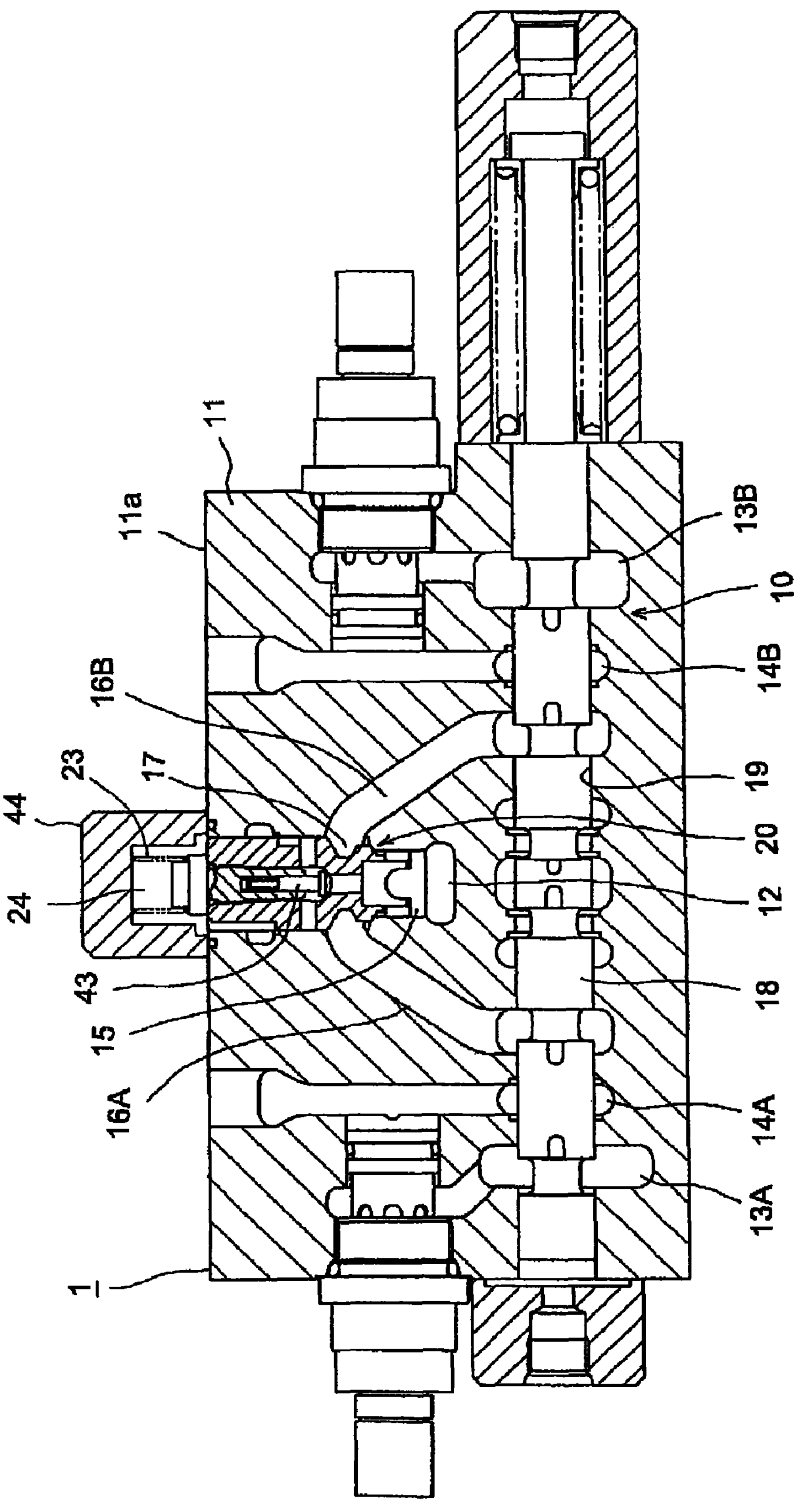
[FIG. 1] A cross-sectional view of one embodiment of a directional control system according to the present invention.
Figure 2:
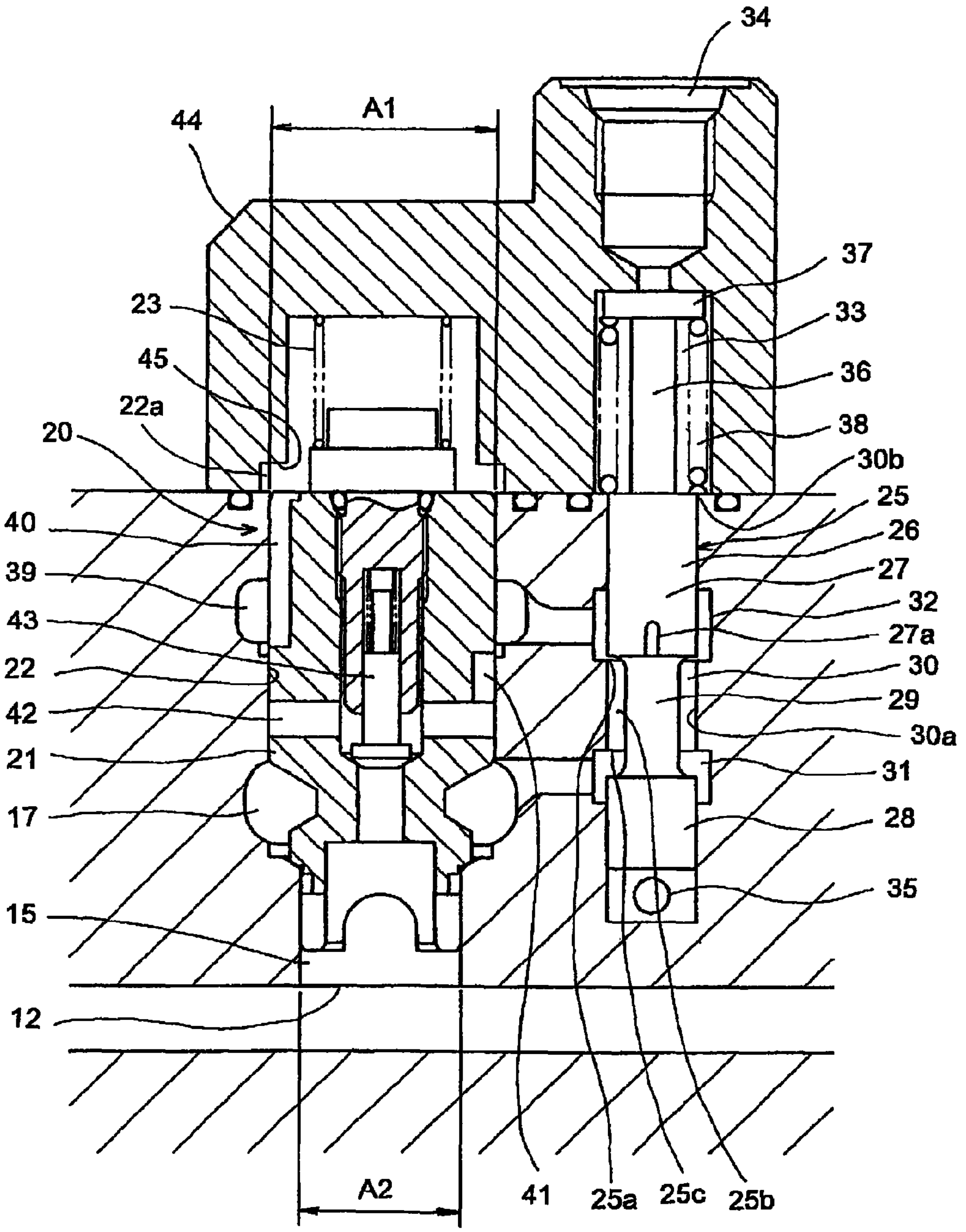
[FIG. 2] An enlarged cross-sectional view of a control means corresponding to a view taken in the direction of arrows II-II of FIG. 1.
Figure 3:
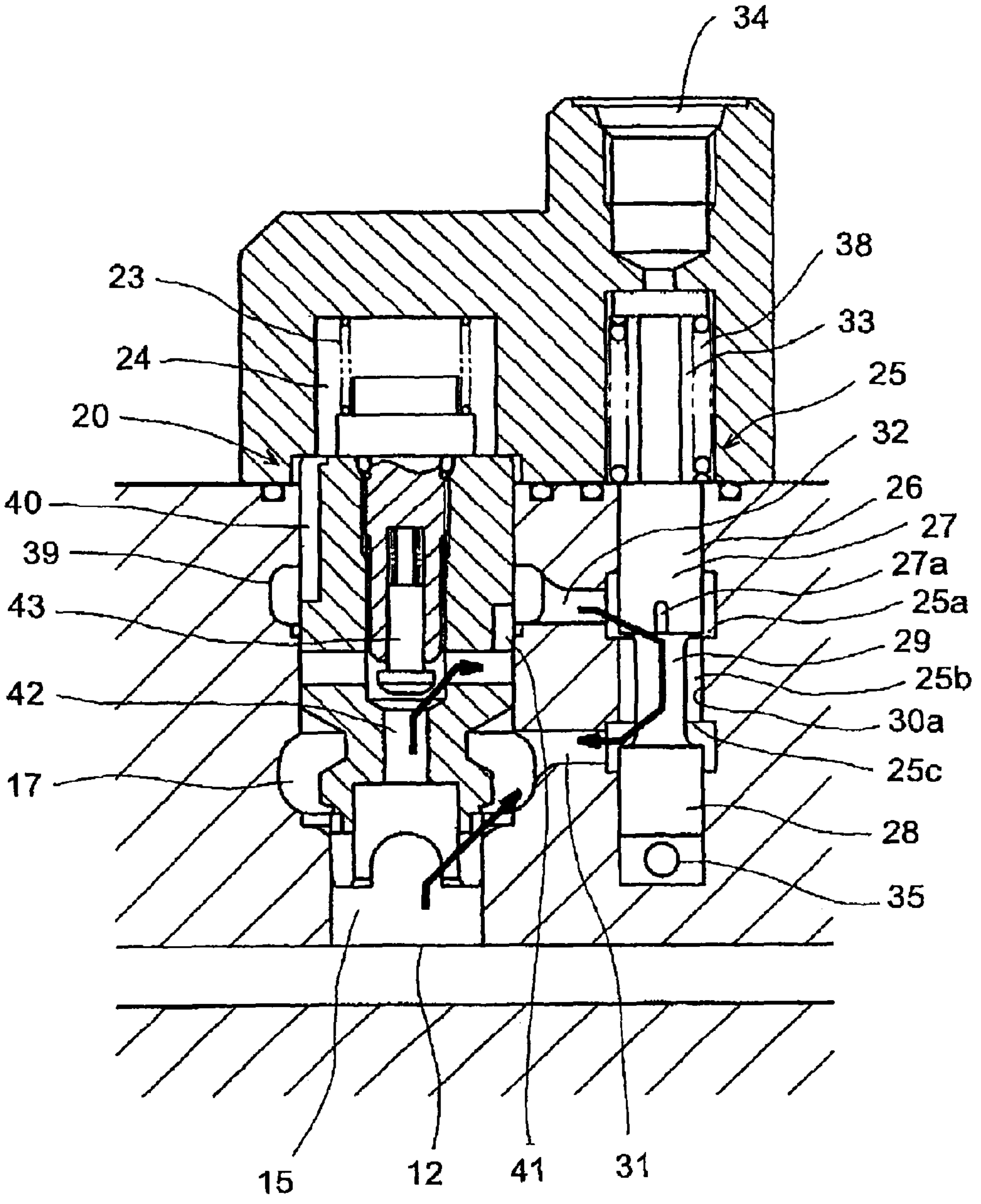
[FIG. 3] A cross-sectional view illustrating a fully open state of a check valve depicted in FIG. 2.
Figure 4:
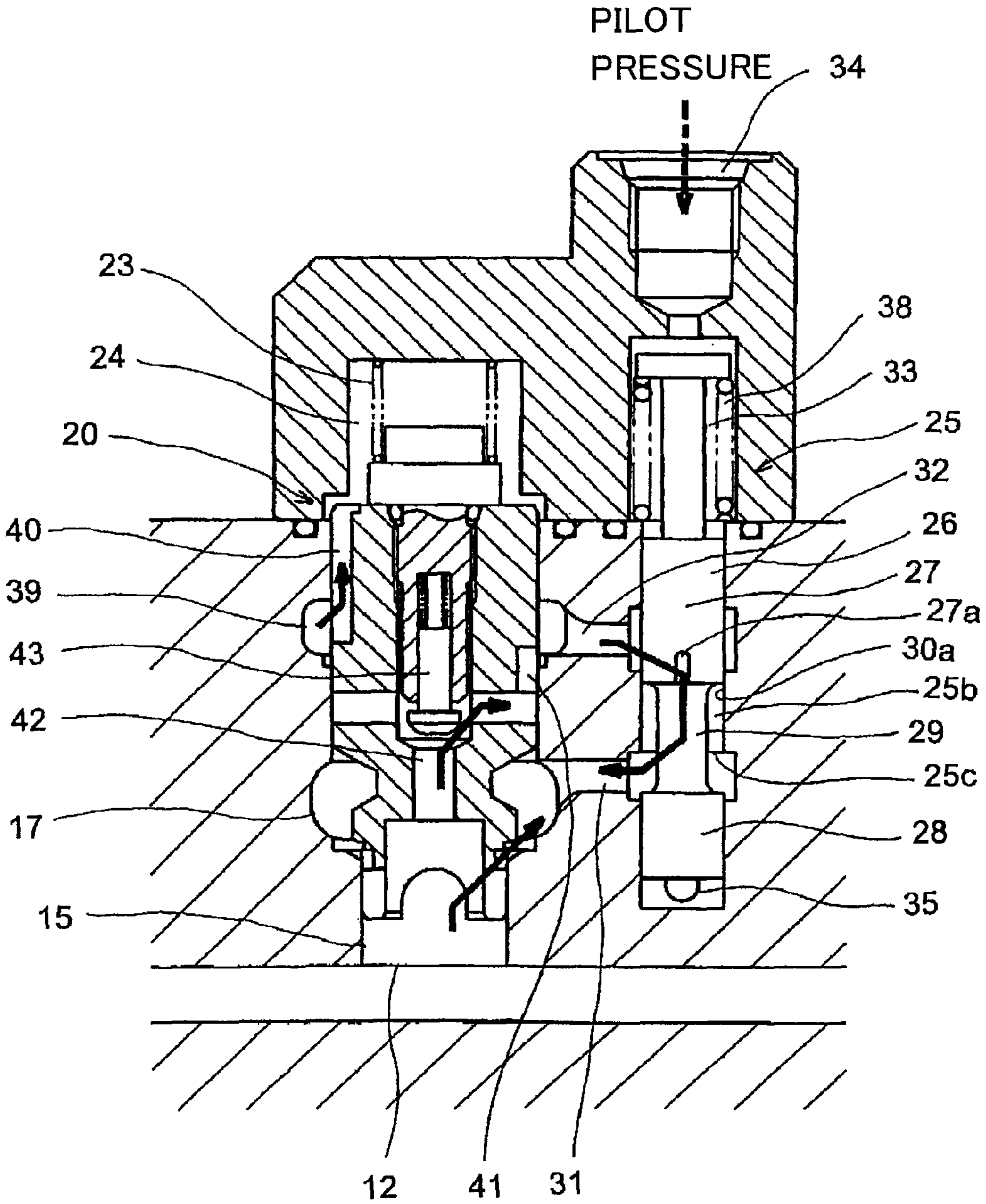
[FIG. 4] A cross-sectional view illustrating a half open state of the check valve depicted in FIG. 2.
Figure 5:
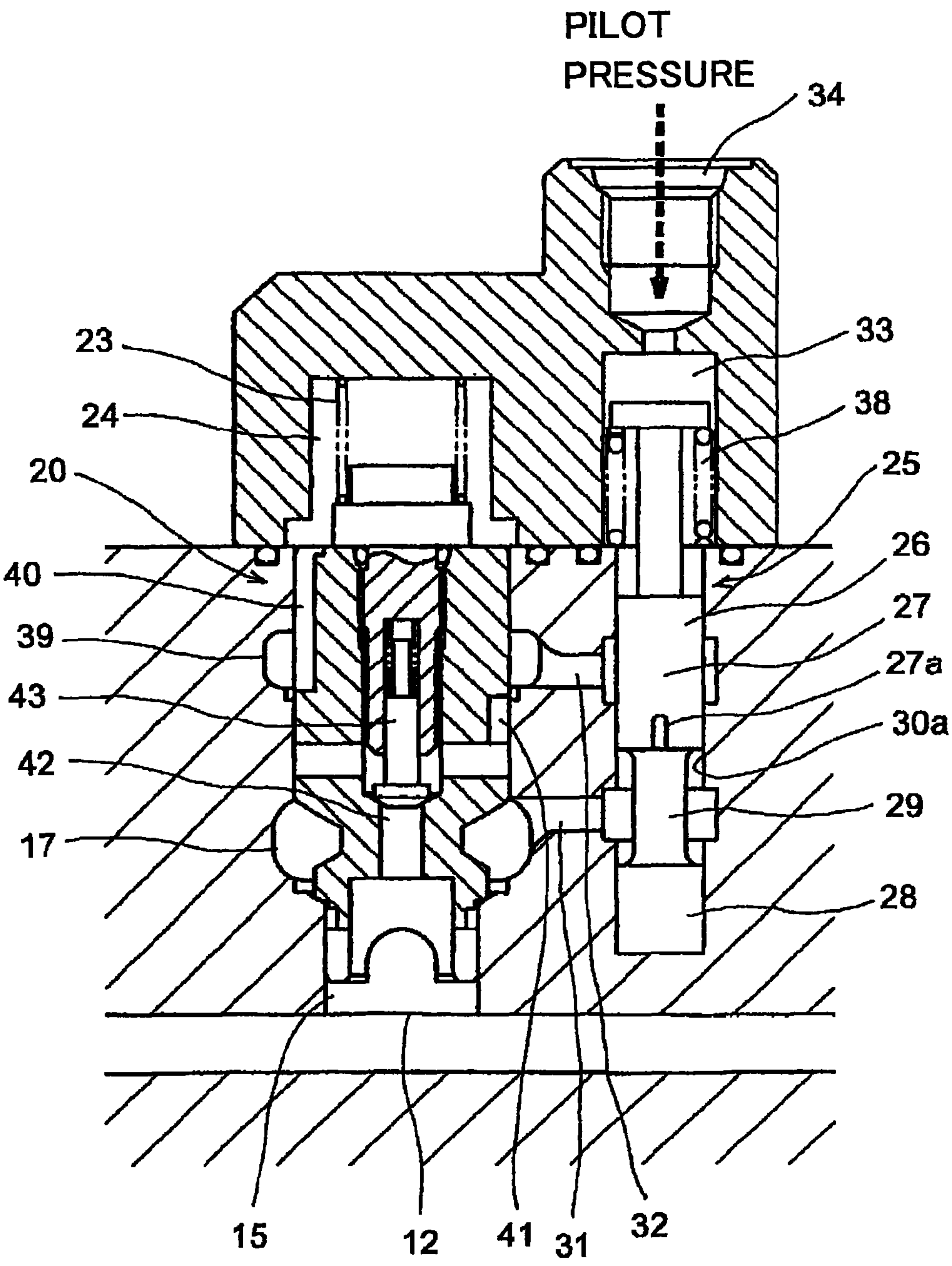
[FIG. 5] A cross-sectional view illustrating a closed state that the check valve has been closed by an operation of an auxiliary check valve depicted in FIG. 2.
Figure 6:
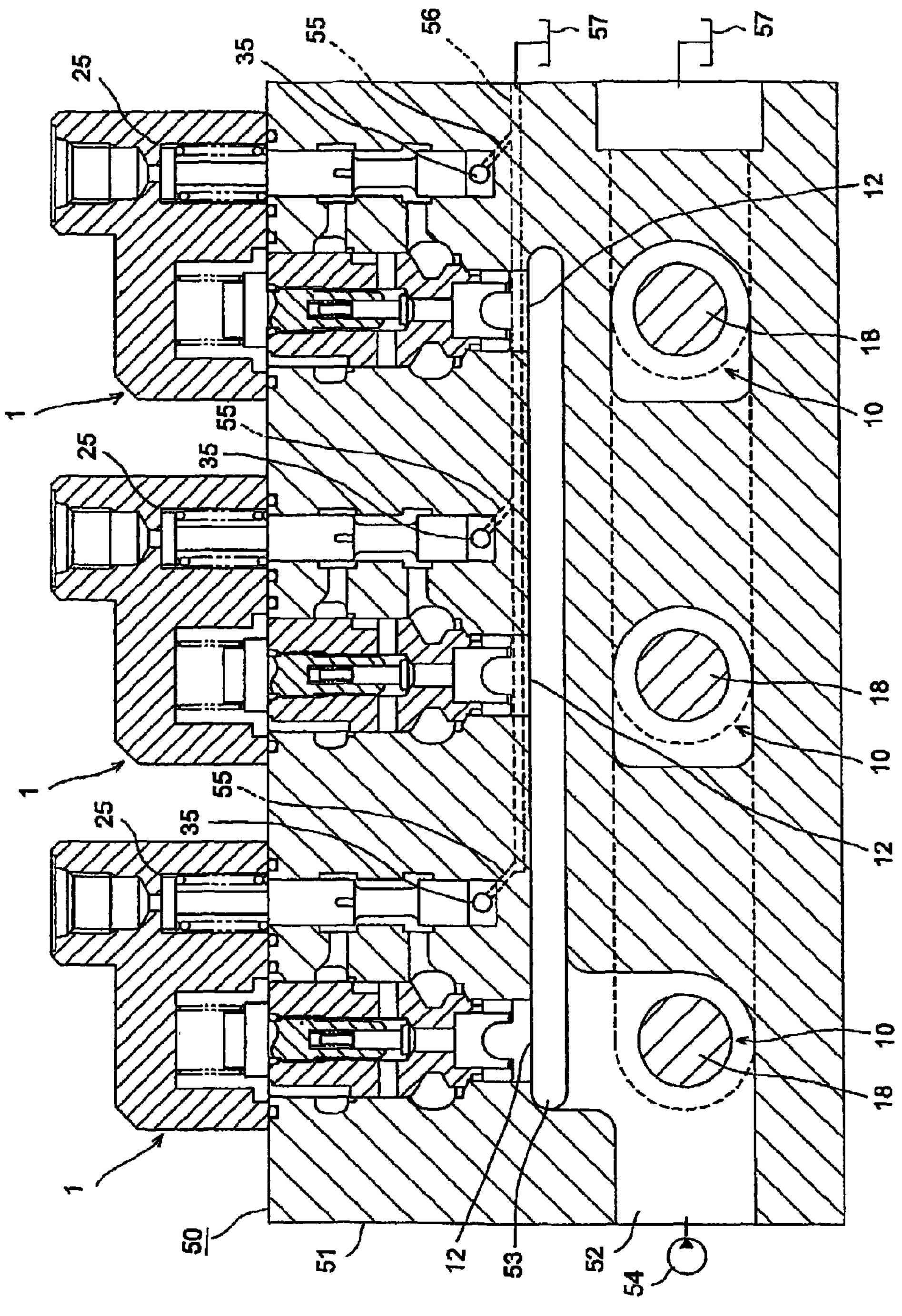
[FIG. 6] A cross-sectional view of one embodiment of a directional control valve assembly block according to the present invention.
Figure 7:
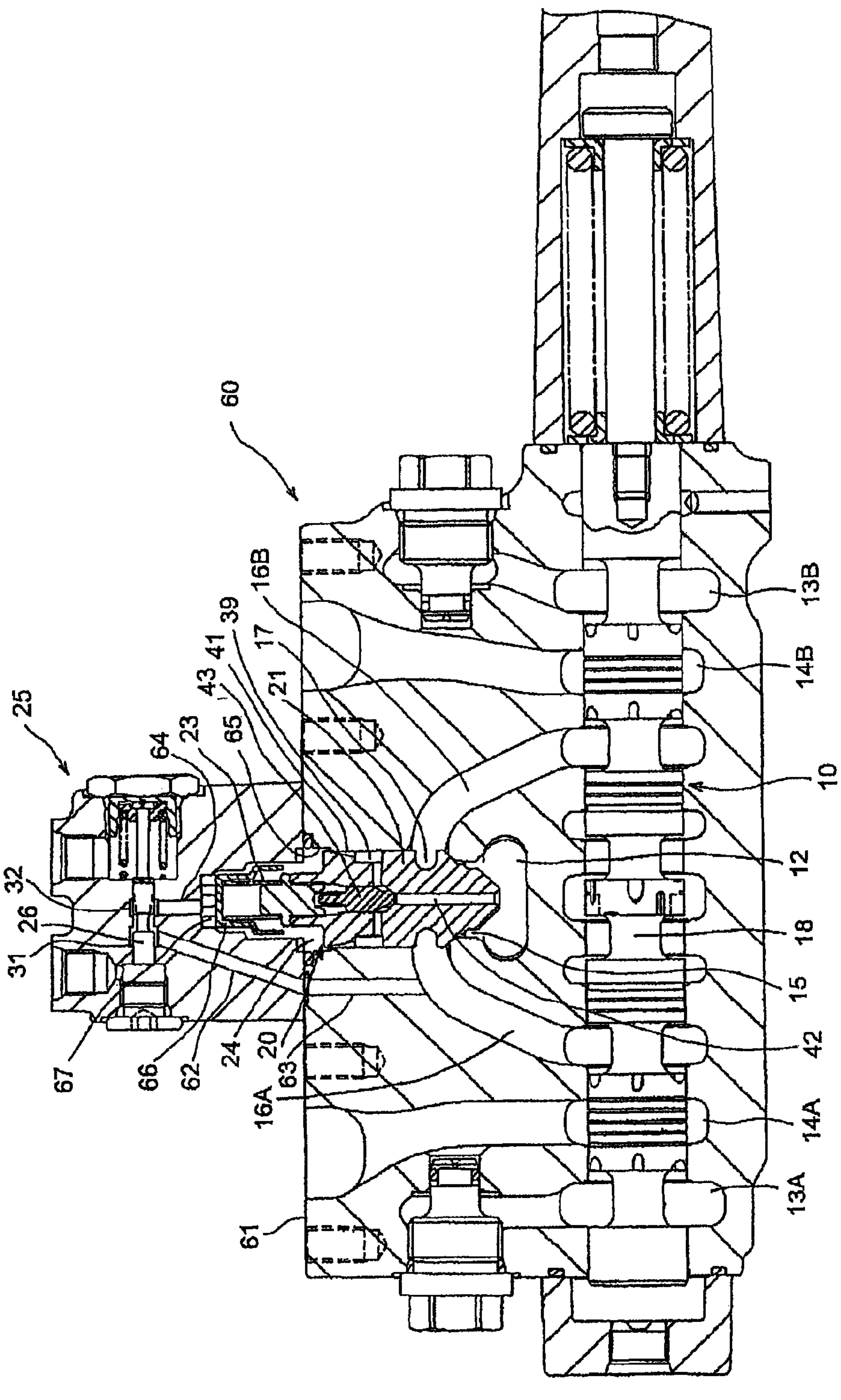
FIG. 7 Prior Art
[FIG. 7] A cross-sectional view of a conventional directional control valve assembly.

1 Directional control valve assembly
10 Directional control valve]
11 Valve body
11*a* End face
12 Supply port
13A First reservoir port
13B Second reservoir port
14A First I/O port
14B Second I/O port
15 Supply passage
16A First branch passage
16B Second branch passage
17 Divergence portion
18 Spool
19 Slide hole
20 Check valve
21 Valve element
22 Slide hole
22*a* Opening
23 Return spring
24 Pressure chamber
25 Control valve
25*a* Gap
25*b* Space
25*c* Gap
26 Spool
27 Large-diameter portion
27*a* Control slot
28 Large-diameter portion
29 Small-diameter portion
30 Slide hole

30*a* Wall
30*b* Opening
31 First port
32 Second port
33 Pilot pressure chamber
34 Pilot port
35 Drain port
36 Rod-shaped portion
37 Spring seat
38 Return spring
39 Oil chamber
40 Slot
41 Control slot
42 Intra-valve-element passage
43 Auxiliary check valve
44 Cap
45 Limiting portion
50 Directional control valve assembly block
51 Valve body
52 Supply port
53 Passage
54 Hydraulic pump
55 Passage
56 Passage
57 Working oil reservoir
60 Directional control valve assembly
61 Valve body
62 Passage
63 Passage
64 Passage
65 Annular cutout
66 Protective member
67 Rectifying member

The invention claimed is:

1. A directional control valve assembly provided with a directional control valve as a main valve, a check valve for controlling a flow rate of pressure oil flowing into said directional control valve, and control means for causing a pressure to act on a valve element, which said check valve is provided with, to limit an opening degree of said check valve, wherein:

said directional control valve is provided with a supply port, first and second I/O ports, a supply passage extending from said supply port, and first and second branch passages diverged from said supply passage, and can be switched into a neutral position where said directional control valve cuts off communication between said first branch passage and said first I/O port and also communication between said second I/O port and said second branch passage, a first valve position where said directional control valve communicates said first branch passage and said first I/O port with each other but cuts off the communication between said second I/O port and said second branch passage, or a second valve position where said directional control valve communicates said second branch passage and said second I/O port with each other but cuts off the communication between said first I/O port and said first branch passage;

said check valve is a spring-return valve that is arranged to be capable of permitting or cutting off communication between a divergence portion, where said first and second branch passages are diverged from said supply passage, and said supply passage and to limit a flow of pressure oil to a direction that the flow is directed from said supply passage toward said divergence portion; and said control means has:

a pressure chamber capable of causing the pressure, which is in a same direction as a biasing direction by a return spring which said check valve is provided with, to act on said valve element, an oil chamber formed around said valve element, a slot formed in at least one of said valve element and a wall of a slide hole, in which said valve element slides, to interconnect said oil chamber and said pressure chamber with each other, a control valve connected directly to said divergence portion and said oil chamber and capable of permitting or cutting off the communication between said divergence portion and said oil chamber and changing an opening degree of the communication, an intra-valve-element passage formed inside said valve element and being open in an end portion of said valve element, said end portion facing said supply passage, and also in an outer peripheral wall of said valve body, said outer peripheral wall being located between said divergence portion and said oil chamber, a control slot formed in said outer peripheral wall of said valve element to communicate said intra-valve-element passage and said oil chamber with each other, and an auxiliary check valve arranged in said intra-valve-element passage to allow pressure oil of a preset pressure or higher to flow from said supply passage into said intra-valve-element passage.

2. The directional control valve assembly according to claim 1, wherein:

a slide hole for a spool of said directional control valve, said slide hole for said valve element of said check valve, and a slide hole for a valve element for said control valve are all arranged in a single valve body, and said check valve and said control valve are adjacent to each other such that an operating direction of said valve element of said check valve and an operating direction of said valve of said control valve become parallel to each other.

3. A directional control valve assembly block comprising:

a plurality of directional control valve assemblies as defined in claim 2 and a valve body composed as an integral unit of valve bodies of the respective directional control valve assemblies, wherein a plurality of passages, which extend from respective drain ports of plural control valves, and a passage, which is interconnected with all of said passages and is open to an outside of said integrated valve body, are formed in said integrated valve body.

* * * * *